United States Patent Office 3,372,211
Patented Mar. 5, 1968

3,372,211
METHOD FOR MANUFACTURING ORGANO-PHOSPHORUS PEROXIDE COMPOUNDS
Nickolai Kirillovich Bliznjuk, Moscow, and Alexei Filippovich Kolomiets and Sergei Georgievich Zhemchuzhin, Moskovskaja Oblast, U.S.S.R., assignors to Vsesojuzny Nauchno-Issledovatelsky Institute Fitopatologii
No Drawing. Filed May 7, 1964, Ser. No. 365,821
3 Claims. (Cl. 260—985)

ABSTRACT OF THE DISCLOSURE

A method for manufacturing organophosphorus peroxide compounds in which hydrogen peroxide is reacted with an organophosphorus compound selected from the group consisting of phosphates, and phosphonates of the formula: R—P(O)(OR')$_2$, wherein R is selected from the group consisting of CH$_3$, (CH$_3$)$_2$NCH$_2$, OH, and R"O, wherein R" is alkyl having 2 to 4 carbon atoms; and R' is alkyl having 2 to 8 carbon atoms.

The organophosphorus peroxide compounds are useful as initiators of polymerization reactions of vinyls and also as herbicides, fungicides, insecticides, and bleaching agents.

---

The present invention relates to the synthesis of peroxide compounds and more specifically, to the synthesis of organophosphorus peroxide compounds.

In much the same way as other peroxides, organophosphorus peroxide compounds give rise to radicals in radical-type reactions. Organophosphorus peroxide compounds may find application as initiators of polymerization reactions of vinyls, and also as herbicides, fungicides, insecticides, and bleaching agents.

So far the only organophosphorus peroxide compounds known in the art are the esters of peroxyphosphoric acid. A method has been described for the synthesis of these compounds, which involves the reaction of dialkyl chlorophosphates with tertalkylhydroperoxides in the presence of alkaline agents, German Patent No. 1,082,895, 1961; and German Patent No. 21,489, 1961. This method, however, is complicated and requires the use of starting materials which are not readily available.

The esters of peroxyphosphoric acid feature limitations which make it difficult to employ said esters for practical purposes, viz, low stability in storage and rapid decomposition on heating up to a temperature of 100° C.

No other types of organophosphorus peroxide compounds have so far been known in the art.

The object of the present invention is to expand the range of available organophosphorus peroxide compounds and to obtain products having the desired physico-chemical properties.

Another object of the invention is to obtain products that would be stable both in storage and at elevated temperatures.

The invention also has for an object to provide a simple procedure by which organophosphorus peroxide compounds may be manufactured from readily available and cheap materials.

In accordance with the present invention, the procedure employed for the manufacture of organophosphorus peroxide compounds consists in the reaction of hydrogen peroxide with organophosphorus compounds, e.g., hydrogen phosphates and tertiary phosphates, hydrogen phosphonates and tertiary phosphonates, phosphites having the formula R—P(O)(OR')$_2$, wherein R is selected from the group consisting of CH$_3$, (CH$_3$)$_2$, NCH$_2$, OH, and R"O, wherein R" is alkyl having 2 to 4 carbon atoms; and R' is alkyl having 2 to 8 carbon atoms.

The reaction is carried out by mixing an organophosphorus compound with hydrogen peroxide, either anhydrous or in the form of aqueous solutions of any concentration. The target product is obtained as a practically quantitative yield. The process may be accomplished either in or without organic solvents.

The preferred embodiment of the present invention involves the use of hydrogen peroxide (25 to 30 percent) without an organic solvent and with subsequent elimination of water by drying in vacuum. Preference should also be given to hydrogen phosphates of tertiary phosphates, as well as to hydrogen phosphonates or phosphonates. With dialkyl phosphates, the stability of peroxide derivatives obtained is comparatively low. The products of the above reaction may be considered as hydrogen peroxide adducts (perhydrates) of the general formula ≡P=O.n.H$_2$O$_2$, where the value of n varies from 0.3 to 2 depending upon the organophosphorus compound used and the reaction conditions employed.

In contrast to peroxyphosphoric acid, which undergoes rapid decomposition at 100° C., the organophosphorus peroxide compounds, as obtained by the procedure, covered by the present patent, are much more stable. For example, the hydrogen peroxide adduct of dibutyl methylphosphonic acid, containing 6.8 percent of available oxygen, starts to undergo vigorous decomposition only at a temperature of 250° C.

Hydrogen peroxide adducts of phosphates and phosphonates are somewhat less stable, starting rapidly to decompose at a temperature of 150 to 160° C.

Thermal decomposition always proceeds smoothly without the danger of explosions.

Hydrogen peroxide adducts of phosphates and phosphonates are, as a rule, liquids that are practically soluble in organic solvents; lower members of the series are likewise soluble in water.

An advantageous feature of the process is the simple manner of its practice, in which use is made of readily available and cheap starting materials.

Another advantage of the process stems from the fact that use is made of organophosphorus compounds, containing the phosphoryl group PO, which makes it possible to obtain a great variety of hydrogen peroxide adducts having the desired physico-chemical properties.

*Example 1.—Synthesis of O,O-dibutyl methylphosphonate perhydrate*

Add to 0.1 g.-mol of dibutyl methylphosphonate with stirring 0.105 g.-mol of 27 percent hydrogen peroxide during mixing, the temperature of the reaction mixture is raised from 22 to 28° C.

To eliminate water, the mixture is maintained in vacuum at 35 to 40° C., benzene being periodically added to the mixture. The residue consists of hydrogen peroxide adduct containing 6.8 percent of available oxygen (n=1.03).

The yield based on the phosphonate used is quantitative, and the degree of hydrogen peroxide utilization amounts to 98 percent.

*Example 2.—Synthesis of O,O-dibutyl methylphosphonate perhydrate in presence of solvent*

A mixture of 0.01 g.-mol of dibutyl methylphosphonate and 0.1 g.-mol of 27 percent hydrogen peroxide in 100 ml. of benzene is vigorously stirred for 10 min. in a separating funnel. Next, the organic layer is separated, and the solvent is distilled off in vacuum at a temperature of 35 to 40° C. The residue consists of a hydrogen peroxide adduct containing 4.35 percent of available oxygen (n=0.67); $d_4^{20}$ 1.0120; $n_D^{20}$ 1.4188. The yield based on the phosphonate used equals 97 percent, and the degree of hydrogen peroxide utilization amounts to 97 percent.

The aqueous layer contains 31 percent of the hydrogen peroxide, introduced into the reaction mixture, so that the loss of hydrogen peroxide is but 2 percent. When the aqueous layer (diluted hydrogen peroxide) is reused under the conditions described above, the reaction yields a hydrogen peroxide adduct containing 3.9 percent of available chlorine ($n=0.59$).

*Example 3.—Synthesis of triethyl phosphate perhydrate*

According to the procedure, as described in Example 1, 0.1 g.-mol. of triethyl phosphate and 0.14 g.-mol. of 27 precent hydrogen peroxide yield a hydrogen peroxide adduct containing 9.0 percent of available oxygen ($n=1.27$); $d_4^{20}$ 1.1440; $n_D^{20}$ 1.4100. The yield based on the phosphate used is 100 percent, and the degree of hydrogen peroxide utilization amounts to 90.5 percent.

*Example 4.—Synthesis of triethyl phosphate perhydrate in presence of solvent*

According to the procedure, as described in Example 2, a mixture containing 0.1 g.-mol. of triethyl phosphate, 0.12 g.-mol. of 27 percent hydrogen peroxide, and 200 ml. of benzene yields a hydrogen peroxide adduct (available oxygen, 3.74 percent; $n=0.53$); $d_4^{20}$ 1.0830; $n_D^{20}$ 1.4118; half-life at 100° C., 24 hrs. The yield based on the phosphate used amounts to 89 percent.

*Example 5.—Synthesis of tributyl phosphate perhydrate in presence of solvent*

The hydrogen peroxide adduct of tributyl phosphate is prepared by the procedure, as described in Example 2, with a yield of 95 percent based on the phosphate used; available oxygen content, 3.7 percent ($n=0.7$).

*Example 6.—Synthesis of triisobutyl phosphate perhydrate in presence of solvent*

The hydrogen peroxide adduct of triisobutyl phosphate is prepared by the procedure, as described in Example 2, from 0.1 g.-mol. of triisobutyl phosphate and 0.07 g.-mol. of 27 percent hydrogen peroxide in 100 ml. of benzene. The product analyzes 2.38 percent available oxygen ($n=0.45$); $d_4^{20}$ 0.9802; $n_D^{20}$ 1.4228; half-life at 100° C., 15.5 hrs.

*Example 7.—Synthesis of O,O-diethyl dimethylaminomethyl phosphonate in presence of solvent*

According to the procedure, as described in Example 2, a mixture containing 0.1 g.-mol. of diethyl dimethylaminomethyl phosphonic acid and 0.09 g.-mol. of 27 percent hydrogen peroxide in 200 ml. of benzene yields a hydrogen peroxide adduct, which analyzes 4.0 percent available oxygen ($n=0.57$); $d_4^{20}$ 1.0023; $n_D^{20}$ 1.4383. The yield based on the phosphonate used equals 83 percent.

*Example 8.—Synthesis of dioctyl phosphate perhydrate in presence of solvent*

0.1 g.-mol. hydrogen peroxide (27 percent) is added with a simultaneous stirring to a solution of 0.1 g.-mol. of dioctyl phosphate in 50 ml. of acetone. The solvent is next distilled off in vacuum, and then the residue is subjected to drying in the presence of benzene.

The hydrogen peroxide adduct obtained analyzes 3.88 percent available oxygen ($n=0.86$); $d_4^{20}$ 0.9906; $n_D^{20}$ 1.4450. The yield based on the phosphate used equals 100 percent.

*Example 9*

Dibutyl phosphate (64 g.) is dissolved in 100 ml. of acetone, and 19 ml. of 30 percent hydrogen peroxide is slowly added to the solution, the temperature of the reaction being maintained in a range of 25 to 30° C. The solution is next freed from acetone by evaporation in vacuum, 100 ml. of benzene is added to the residue, and the mixture is repeatedly washed with water. To remove benzene and water, the solution is placed on a water bath with a temperature up to 30° C. The residue consists of a clear mobile liquid (87.4 g.), which analyzes 20.3 percent available oxygen; $d_n^{20}$; 1.043; $n_D^{20}$ 1.4280.

Explosion hazards at elevated temperatures preclude the isolation of individual products of the reaction by vacuum distillation.

It should be understood that although a preferred embodiment of the invention has been disclosed in the description, various alterations and modifications may be allowed, without departing from the spirit and the scope of the invention. For instance, the procedure disclosed herein may be employed for the synthesis of hydrogen peroxides adducts of trialkylphosphene oxides or other compounds containing the phosphoryl group.

We claim:

1. A method for manufacturing organophosphorus peroxide compounds comprising reacting hydrogen peroxide with an organophosphorus compound selected from the group consisting of phosphates and phosphonates of the formula R—P(O)(OR')$_2$, wherein R is selected from the group consisting of $CH_3$, $(CH_3)_2NCH_2$, OH, and R"O, wherein R" is alkyl having 2 to 4 carbon atoms; and R' is alkyl having 2 to 8 carbon atoms.

2. A method according to claim 1, wherein the reaction is carried out in an organic solvent.

3. A method according to claim 1, wherein the reaction is carried out at a room temperature and with reactants taken in a ratio of 1:1.

References Cited

Henkel, Chemical Abstracts, vol. 57 (1962), p. 15156.

CHARLES B. PARKER, *Primary Examiner.*

A. H. SUTTO, *Assistant Examiner.*